Figure 3:
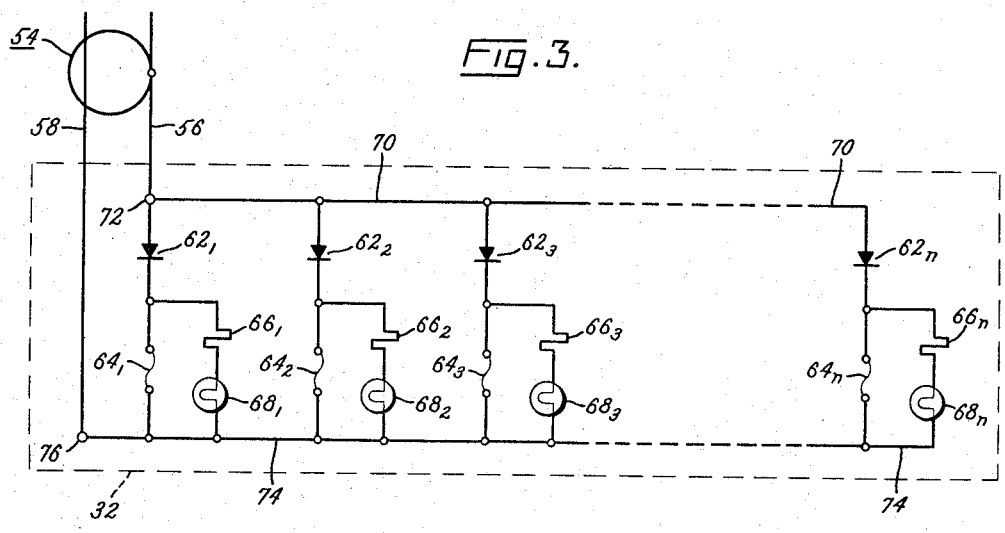

Feb. 20, 1968
G. J. BOWAR ET AL
3,370,216
INTEGRAL TRANSFORMER-RECTIFIER SYSTEM WHEREIN LIQUID COOLED
HEATSINKS FOR CURRENT RECTIFYING COMPONENTS ARE
MOUNTED ON COAXIAL BUSHINGS
Filed Dec. 21, 1965
5 Sheets-Sheet 1
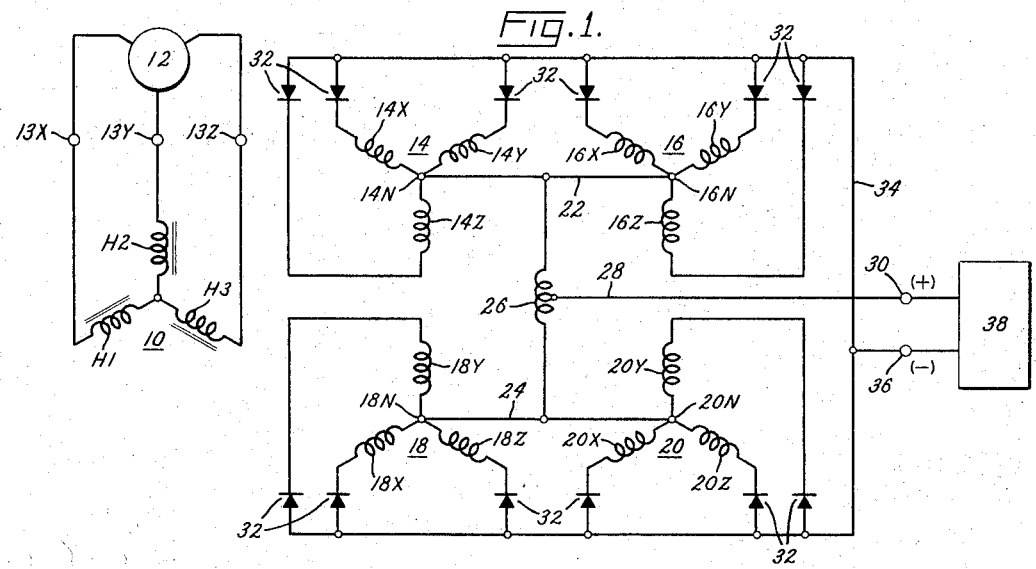
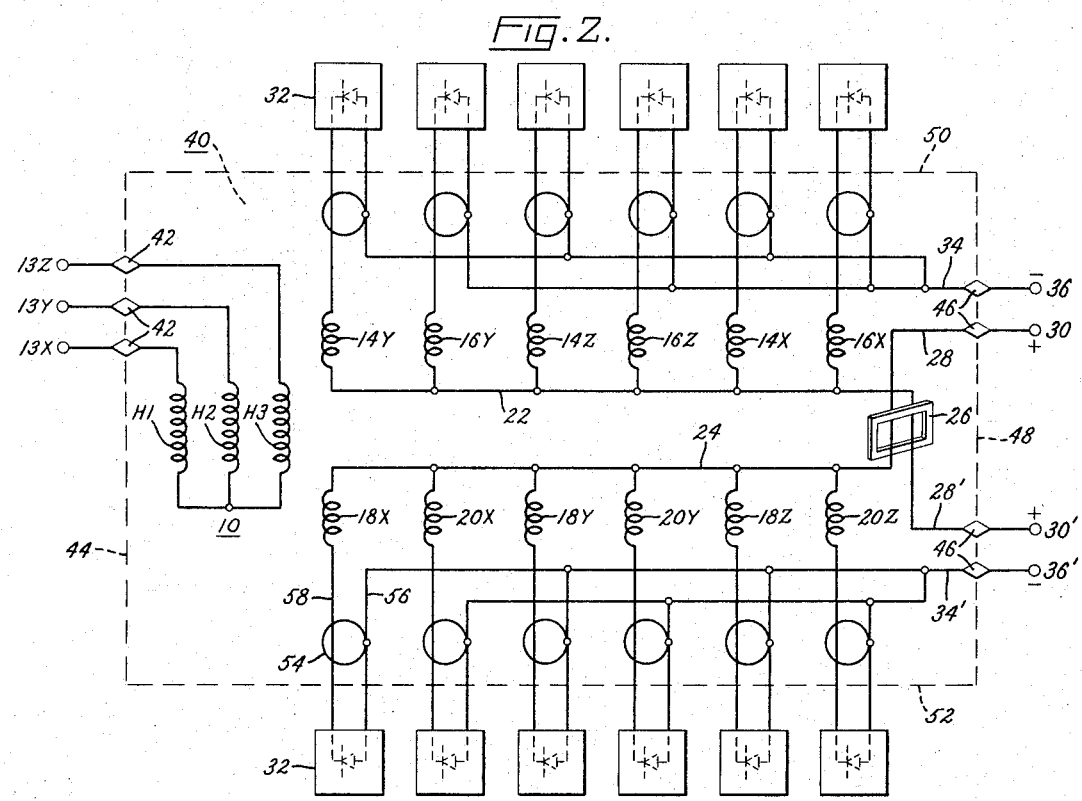
INVENTORS:
GERALD J. BOWAR,
JACK A. MARSHALL,
LEON H. SPEROW,
BY Albert S. Richardson Jr.
ATTORNEY INVENTORS:
GERALD J. BOWAR,
JACK A. MARSHALL,
LEON H. SPEROW,
BY Albert S. Richardson Jr.
ATTORNEY

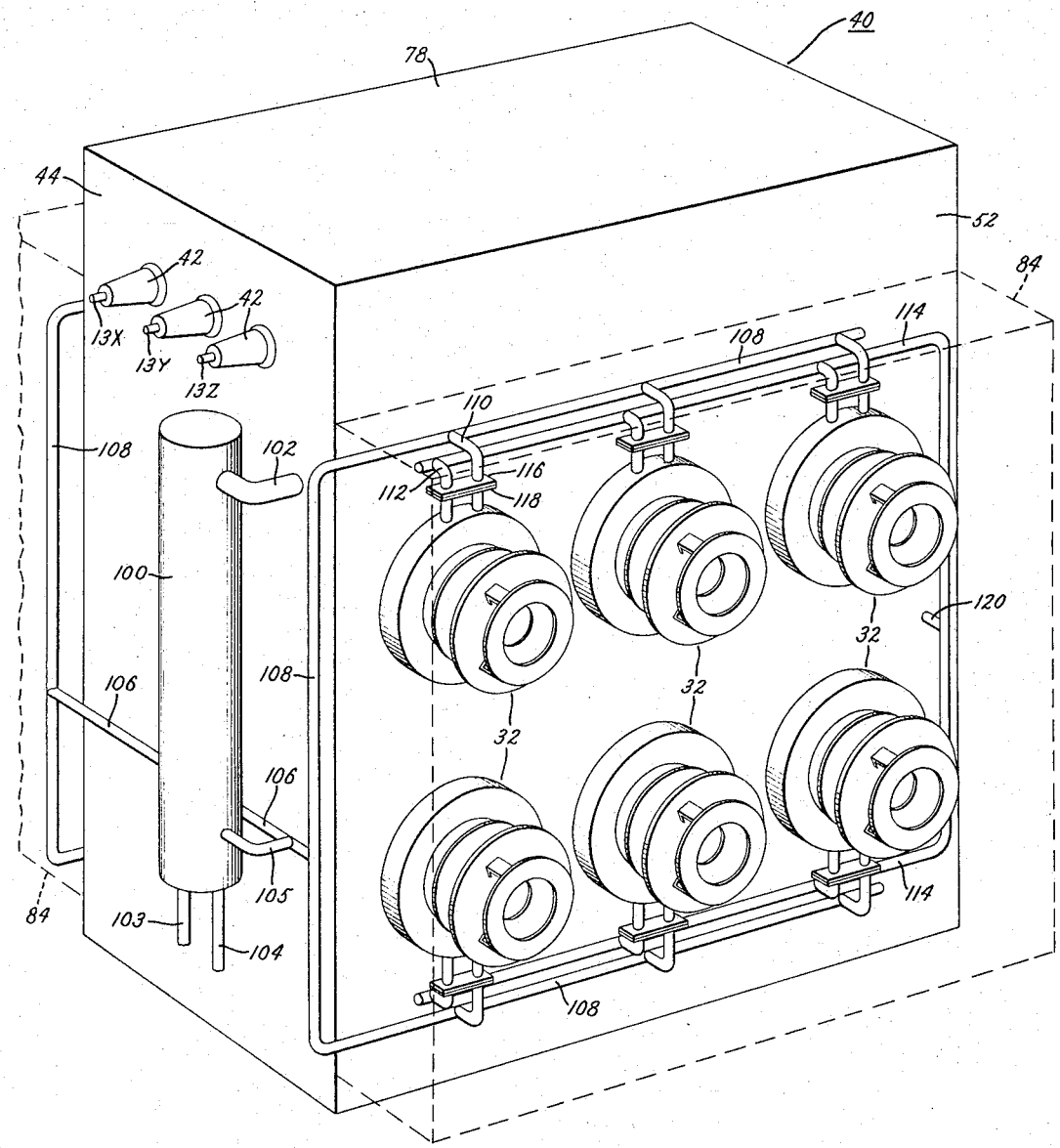

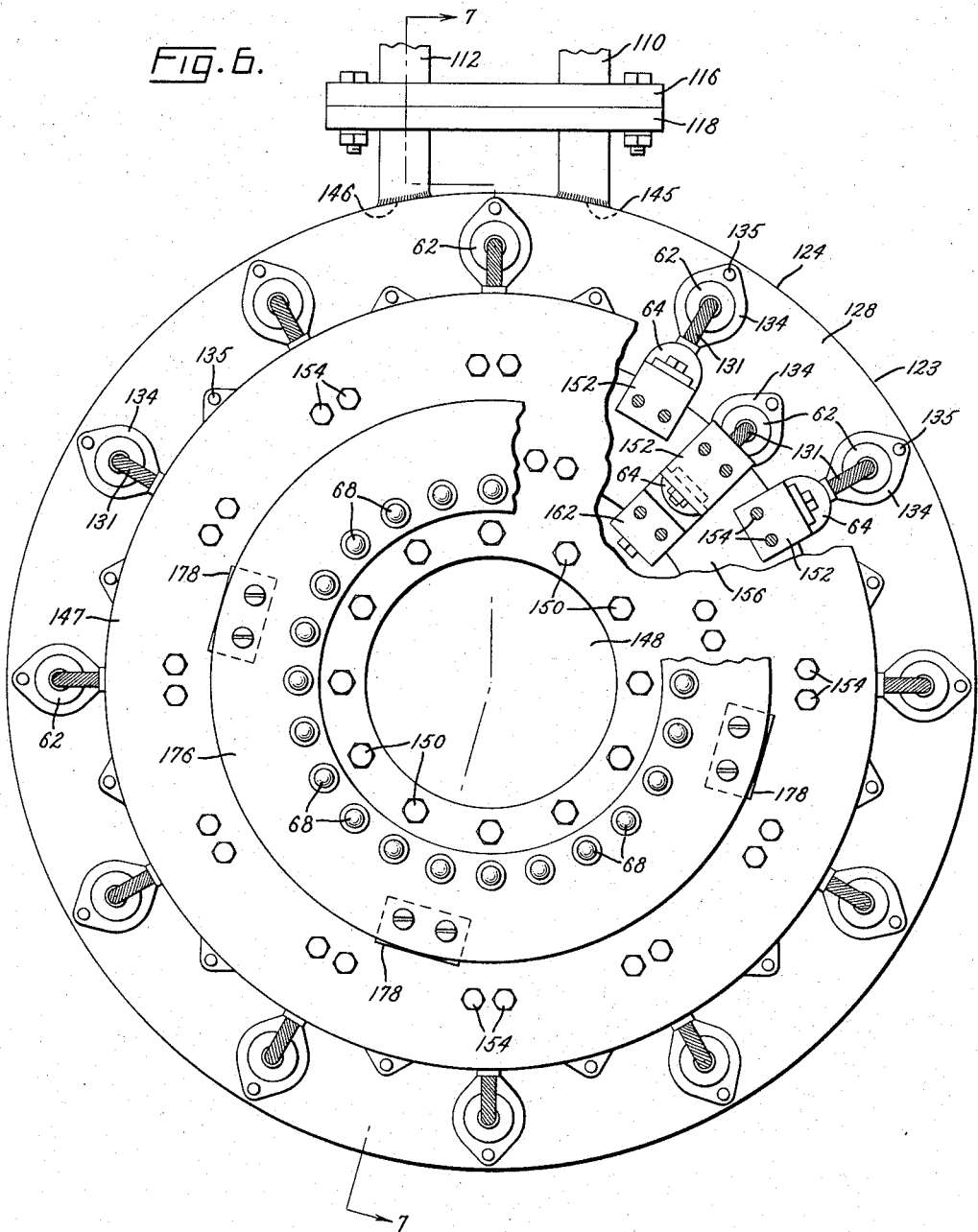

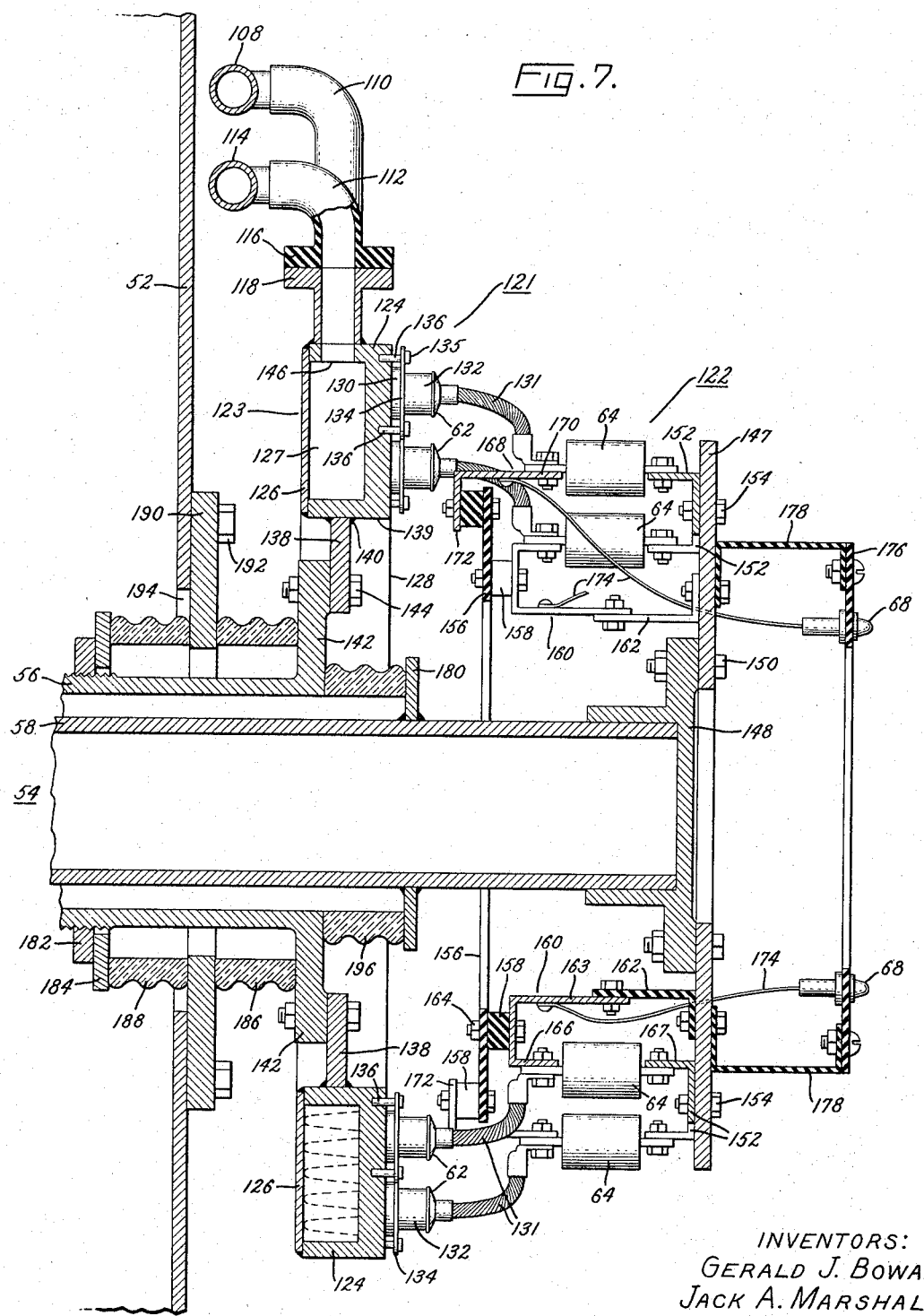

3,370,216
INTEGRAL TRANSFORMER-RECTIFIER SYSTEM WHEREIN LIQUID COOLED HEATSINKS FOR CURRENT RECTIFYING COMPONENTS ARE MOUNTED ON COAXIAL BUSHINGS
Gerald J. Bowar, Broomall, and Jack A. Marshall and Leon H. Sperow, Springfield, Pa., assignors to General Electric Company, a corporation of New York
Filed Dec. 21, 1965, Ser. No. 515,326
10 Claims. (Cl. 321—8)

This invention generally relates to an alternating-current-to-direct-current conversion system. More particularly, the invention is directed to a high-current integral transformer-rectifier apparatus.

For many years bulk electric power conversion was accomplished by mecury-arc rectifier systems, ignitron systems, or rotary conversion systems. Recently developed solid-state, semiconductor rectifying devices are able to conduct unidirectional current in the order of hundreds of amperes; and, as a result, great interest has been shown in substituting semiconductor rectifier systems for prior art systems. Primarily this interest exists because a semiconductor rectifier system generally requires less space and maintenance than the prior art systems for a given current rating, and it is generally more efficient and reliable.

It is a general object of the present invention to provide an improved transformer-rectifier which is an integral, self-container unit comprising a power transformer and a plurality of high-current semiconductor devices and which is characterized by economy of material and convenience of installation.

Current capabilities of semiconductor rectifier cells have been increased not only by boosting individual ratings but also by paralleling a plurality of cells. However, parallel operation of semiconductor rectifiers can introduce several problems at high current ratings. For example, if the forward characteristics of parallel rectifier cells are not mached, current imbalance occurs; and such imbalance can damage the cells. In order to minimize this particular problem, it has proven advantageous to dispose similar semiconductor devices in a symmetrical, coaxial design wherein the devices are mounted on a conductive member in a symmetrical arrangement about coaxial conductors that couple the devices into a rectifier circuit. This method of current balancing has given satisfactory results in high-current applications where more than ten devices has been paralleled.

Therefore, another object of this invention is to provide an improved integral transformer-rectifier wherein currents through parallel rectifying devices are balanced by a symmetrical coaxial arrangement thereof.

When a plurality of semiconductor rectifier cells are used to obtain high currents, heat generated by the rectifier can also become troublesome. Even though the power loss in a rectifier cell is negligible in relation to total power rating, heat generated from a plurality of cells can, without some form of thermal protection, raise the rectifier junction temperature above the rectifier operating temperature limit. Various heatsinks have been proposed and used to alleviate this difficulty, such as placing a plate of good thermal conductivity having a plurality of fins extending into a forced airstream or utilizing a similar plate wherein the fins contact cooling water. However, this type of heatsink is subject to limitations especially as to the quantity of heat which can be effectively and practicably removed.

Therefore, another object of this invention is to provide a transformer-rectifier with an improved rectifier heatsink which permits a more economical heat transfer from the rectifying devices mounted thereon.

It is a further object of this invention to provide a compact high-current transformer-rectifier system wherein substantially all of the current carrying components and conductors are cooled by transformer cooling oil.

In accordance with one relevant prior art practice, a tank, containing the transformer oil and the transformer core and windings, has a plurality of apertures formed in the walls of the tank. These apertures are normally closed by conducting heatsinks insulated from the transformer wall, and a plurality of semiconductor diodes are externally mounted on each heatsink. A direct current bus is located externally to the tank so that one main electrode of each cell can be connected thereto. The other main electrodes are electrically connected by way of the heatsinks to the respective transformer secondary windings inside the transformer tank. With this structure, oil has to be drained from the transformer tank before the heatsink is removed. Furthermore, this prior art design does not lend itself to the complete preassembly of diodes and heatsink at a location that is geographically separate from the transformer manufacturing facility, as is sometimes desired.

It is therefore a further object of this invention to provide a transformer-rectifier with an improved rectifier oil-cooled heatsink which can be easily separated from the transformer for manufacturing and shipping convenience.

Still another object of this invention is to provide a compact and economical transformer-rectifier wherein the rectifying devices are easily accecssible from the exterior of the transformer tank while substantially all the conductors are safely disposed inside the tank to provide an integral unit.

Basically, in an integral transformer-rectifier apparatus a heatsink which includes this invention comprises a hollow ring of material which has the excellent electrical and thermal conductivity characteristics. Means for mounting a plurality of uniformly spaced-apart rectifier cells in a symmetrical annular pattern on the hollow ring hold a first electrode of each cell in good thermal and electrical contact with the ring, whereby heat generated in and forward current conducted by the cells is easily transferred to the hollow ring. Oil normally associated with the transformer is circulated through the hollow ring to remove the heat therefrom and transfer the heat to a heat exchanger which can be associated with such a transformer.

The hollow ring heatsink is mounted on an exterior coaxial bushing of the transformer tank. One conductor of the bushing is connected between a terminal of a transformer secondary winding and the hollow ring, while the compansion concentric conductor is used to interconnect a common D-C bus inside the transformer tank and an external conducting flange to which the second main electrodes of the paralleled rectifier cells are respectively connected. Another D-C bus is connected in the tank to an opposite terminal of the aforesaid secondary winding, and both buses are brought out of the tank for connection to an external D-C load by relatively negative and positive load bushings in the tank walls. In a polyphase arrangement additional rectifier subassemblies of this design are ordinarily mounted on other coaxial bushings respectively associated with a plurality of transformer secondary windings.

By employing ring-like heatsinks on coaxial bushings in the manner summarized above, and by locating both of the aforesaid D-C buses inside the transformer tank, we have been able virtually to eliminate from the vicinity of the rectifier cells magnetic flux that would otherwise adversely affect the requisite balance of current among parallel cells and between adjacent rectifier subassemblies.

Figure 4:
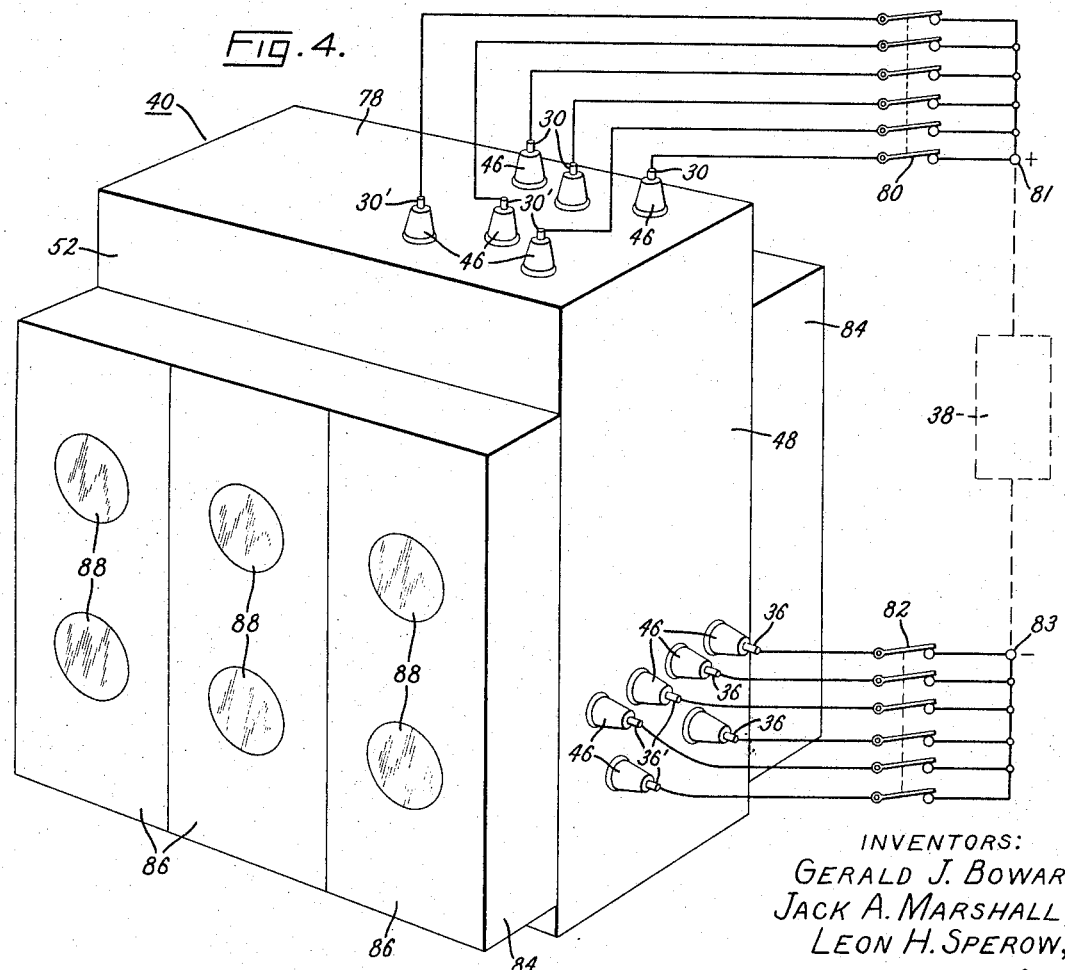

Our invention will be better understood and its various objects and advantages more fully appreciated from the following description taken in conjunction with the accompanying drawings in which:

FIG. 1 schematically illustrates a polyphase rectifier system in which this invention has utility;

FIG. 2 schematically illustrates the position of the various elements of the transformer-rectifier unit comprising this invention;

FIG. 3 schematically illustrates a rectifier subassembly shown in block form in FIG. 2;

FIG. 4 presents a perspective view of a transformer cabinet and external electrical connections to couple the transformer-rectifier to a D-C load which can be used with an apparatus incorporating this invention as shown schematically in FIG. 2;

FIG. 5 presents another perspective view of the transformer shown in FIG. 4 and particularly the A-C source bushings and the oil cooling means associated therewith;

FIG. 6 is an enlarged end view of a rectifier subassembly which is constructed in accordance with this invention; and FIG. 7 is a sectional view along line 7—7 in FIG. 6.

As the same elements appear in several of the figures, similar components and elements have been designated by the same number in each figure.

Referring to FIG. 1, the polyphase electric power conversion system shown therein is known in the art as a Y, 6-phase parallel double-Y rectifier. Basically the conversion system comprises a transformer having a primary 10 comprising three star-connected windings H1, H2, and H3 adapted to be energized by a 3-phase high-voltage A-C source 12 connected to input terminals 13X, 13Y and 13Z. Associated with primary 10 and energized thereby are two-parallel sets of 3-phase double Y secondaries 14, 18 and 16, 20 with a common interphase 26 connected as shown in FIG. 1. For example, secondary 14 includes phase windings 14X, 14Y and 14Z having a common neutral terminal 14N. The parallel double-Y configuration is obtained by tying neutral terminals 14N and 16N together with a conductor 22 and tying neutral terminals 18N and 20N together with a conductor 24. The secondary is completed by connecting the neutral conductors 22 and 24 in opposite directions through the interphase winding 26 to a common D-C conductor 28 which in turn is coupled to an output or load terminal 30.

Direct current is obtained from this system by placing rectifying means 32 in series with each phase winding of the transformer secondaries. The cathode of each rectifying unit 32 is shown connected to a second terminal of the associated phase winding that is opposite its neutral terminal, and each anode is tied to a common D-C conductor 34 coupled to another output or load terminal 36. Thus the output terminal 36 is negative with respect to 30, although this polarity could be reversed by poling the rectifying units 32 in a sense opposite to that shown. As known in the art, this rectifier system converts high-potential 3-phase A-C input power to a low-voltage high-direct-current power for purposes of supplying an external D-C load (shown diagrammatically at 38) such as an electrochemical processing apparatus.

The transformer-rectifier apparatus in FIG. 2 is diagrammatically shown as it is positioned with relationship to a transformer tank 40. Bushings 42, rated at the high voltages of primary 10, extend through a first wall 44 of transformer tank 40 to act as a high voltage feedthrough means. When the transformer rectifier is cooled by oil in tank 40, each bushing 42 is affixed to wall 44 in sealing engagement therewith so that oil does not leak from tank 40. Somewhat similar bushings 46, which are mounted on a second wall 48, serve to bring out the positive and negative load terminals 30, 30' and 36, 36' from the internal D-C buses 28, 28', 34 and 34', respectively. At this point it should be obvious to those skilled in the art that the actual number of bushings 46 used depends on their per unit current rating; for example, six positive and six negative bushings rated 10,000 amperes each could be used to supply total load current in excess of 60,000 amperes.

Externally mounted on third and fourth walls 50 and 52 of tank 40 are the plurality of rectifying units 32 which are mechanically supported on tank 40 and electrically tied into the electrical circuit by a plurality of sets of first and second coaxial conductors 54 extending through these walls. Each set of coaxial conductors includes an outer conductor 56 which connects the associated rectifying unit 32 to the negative bus 34 or 34' inside the tank, and spaced therefrom is a companion inner conductor 58 which serves to connect the unit 32 to the associated transformer secondary winding.

Each rectifying unit 32 preferably comprises a plurality of semiconductor rectifier cells or diodes and individual protective devices as is illustrated schematically in FIG. 3. More particularly, the outer coaxial conductor 56 is connected to the anodes of a plurality of silicon diodes $62_1$, $62_2$, $62_3$, ... $62_n$, and each diode is individually connected in series with fuses $64_1$, $64_2$, $64_3$, ... $64_n$. Indication of a diode failure is provided by a visual or audible signalling means shown specifically in FIG. 3 as a dropping resistor $66_1$ and a neon lamp $68_1$ connected in parallel with fuse $64_1$; similar circuits are connected in parallel with each fuse. Conventional voltage surge suppression means (not shown) will also be included in practice.

A plurality of diodes 62, fuses 64, resistors 66 and neon lamps 68 are connected in parallel between two conductors 70 and 74 to form each rectifying unit or subassembly 32. The conductors 70 and 74 are electrically connected to the outer ends or terminals 72 and 76 of the coaxial conductors 56 and 58, respectively. Such a multiple diode rectifying unit 32 is, as shown symbolically in FIG. 2, connected externally to the transformer tank 40 in electrical series with each transformer secondary winding.

From this schematic arrangement in FIG. 3, it can be seen that each silicon diode 62 is effectively connected in parallel with as many other diodes as required for the desired current rating of the rectifying unit 32. For example, 24 500-amp diodes have been successfully used in parallel in a rectifying unit required to carry an average current of 5,400 amperes. If there is rectifier failure causing any of the fuses 64 to blow, the indicating means, neon lamp 68, specifically indicates the faulty diode so that it can be quickly and easily replaced.

FIGS. 4 and 5 present physical views of an integral transformer-rectifier apparatus embodying this invention. FIG. 4 shows transformer tank 40 with tank walls 48 and 52 and a plurality of load bushings 46 extending from a top wall 78 of the tank and from the end wall 48. These are low-voltage, high-current bushings which form output terminals 30, 30' and 36, 36' adapted to be connected to a D-C load 38, shown in outline form. A total of six terminals 30, 30' are shown connected through a high-current gauged disconnect switch 80 to the positive terminal 81 of the load, and six terminals 36, 36' are shown connected through a similar switch 82 to the negative terminal 83 of the load. For additional current capacity, other similar transformer-rectifier units can be connected to the terminals 81 and 83 with the illustrated apparatus.

Auxiliary cabinets 84, mounted to exterior portions of opposite side walls of the transformer tank 40, are divided into three areas by three vertical doors 86 each containing two windows 88 at different elevations. One rectifying unit 32 is mounted in each compartment area defined by a door 86 behind and adjacent to each of the windows 88. In the structure shown in FIGS. 4 and 5, twelve rectifying units 32 are mounted on tank 40, with six units being mounted adjacent wall 50 and six more adjacent the opposite wall. As each unit 32 is mounted directly behind a window 88, any indication of individual diode failure can be readily ascertained by visual inspection of the neon lamp indicating means located immediately adjacent windows 88.

Referring specifically to FIG. 5, the A-C input terminals 13X, 13Y and 13Z and the source bushings 42 are shown as extending through the end wall 44 of the tank 40 to serve as connecting points for conductors from an external 3-phase source. Auxiliary cabinets 84 are shown in outline form so that the position of the rectifying units 32 can be seen with relationship to transformer tank wall 52. As previously discussed, transformers in such transformer-rectifier apparatus as utilize this invention normally have liquid (oil) cooling in order to operate at the required currents. Therefore, FIG. 5 additionally shows an oil circulation system wherein a heat exchanger 100 is shown having an inlet 102 communicating with interior portions of tank 40. A suitable liquid pump (not shown) is associated with the inlet 102 to tank 40 to the heat exchanger 100. In the heat exchanger, the oil is cooled by circulating water which is delivered thereto by means of water pipes 103 and 104 adapted to be connected to a source of cooling water. The cooled oil flows out of the heat exchanger through a pipe 105 to a pair of connecting pipes 106 which direct oil to the cooling system for the rectifying units 32, and ultimately the oil returns to the tank 40 through pipes 120. As the oil cooling arangements for the rectifiers on each side of the transformer tank 40 are identical, only that which cools the various units 32 associated with the near side wall 52 is discussed herein.

Connecting pipe 106 joins a pair of oil delivery pipes or headers 108 to heat exchanger 100. Each header 108 communicates with three separate rectifying units 32 by way of an insulating hose 110, and oil circulated through each unit 32 is removed therefrom by way of another insulating hose 112 which directs the oil to a common oil exhaust pipe. There is one inlet hose 100 and one outlet hose 112 associated with each rectifying unit 32, and they are terminated with a flange 116 which cooperates with a mating flange 118 mounted on unit 32 as discussed and shown more clearly hereinafter. Oil exhaust pipe 114 then connects to an oil return pipe 120 which delivers oil back into the transformer tank for circulation therethrough and back to the heat exchanger 100. In this manner, it can be seen that the oil is circulated not only through the transformer tank 40 but also through each individual rectifying subassembly 32 to remove heat generated therein. Further, any unit 32 can be removed from tank 40 without oil loss by merely separating flanges 116 and 118 after the oil flow has been stopped by suitable valves (not shown) in the headers 108 and 114.

Referring now to FIGS. 6 and 7, the preferred structure of a rectifying unit 32 adapted to be mounted on the transformer tank 40 can be discussed. Basically, this unit includes a diode-heat sink subassembly 121 and a fuse-indicating means subassembly 122. The diode-heat sink subassembly 121 includes a hollow annular member or ring 123 which is specifically shown as being formed from an annularly extending shell 124 closed by a cover plate 126 to form an annular chamber 127. This ring-like heatsink 123 is made of aluminum or other conducting material, and it has at least one planar surface 128 to which a plurality of rectifying devices 62 are mounted in electrical, mechanical, and thermal contact therewith.

In the particular embodiment shown herein, each device 62 comprises a silicon diode housed in a cylindrical insulating body 132. One main electrode (preferably the anode) of the diode 62 is formed by a metallic flanged end portion 130 of the device, and the second main electrode (the cathode) is formed by a flexible conductive cable 131 at the opposite end. A spring washer 134 slips over the body 132 and is affixed to the channel shaped member 124 of the heatsink 123 by fastening means, such as nuts 135 on a pair of studs 136, thereby removably clamping the anode 130 directly to the planar surface 128. In order to obtain proper current balance among the paralleled diodes 62, they have been disposed in a symmetrical pattern on the ring 132. This is best seen in FIG. 6 where it will be observed that there are two concentric of 12 uniformly spaced diodes each.

Electrical connection between the anodes 130 of the diodes 62 and negative D-C bus bars supported by insulators within the transformer tank 40 is provided by the outer coaxial conductor 56. Toward this end, as is shown in detail in FIG. 7, a first rectifier unit terminal 138 comprising a plurality of plate members extending radially inward from a side portion 139 of the heatsink 123 is affixed thereto by some fastening means, shown particularly herein as a weld 140. Each terminal 138 is adapted to be bolted at 144 to a radially extending conducting flange 142 formed on the outer conductor 56 of the coaxial conductors 54. When fastened to the transformer tank in this manner, the annular heatsink 123 will be concentrically disposed with respect to conductors 54. Each rectifier 62 has its anode connected to the heatsink 123 (corresponding to the conductor 70 in FIG. 3) which in turn is connected by the terminal 138 to the outer coaxial conductor 56. Inside the transformer tank the conductor 56 is connected to one of the D-C buses (see 34, 34' in FIG. 2) which in turn is connected to a negative output terminal 36 or 36' of the transformer-rectifier system.

Cooling oil is pumped through the header 108 and branch pipe 110 from the heat exchanger 100 (FIG. 5) to be circulated through the annular chamber 127 in the heatsink 123. A baffle member, not shown, is disposed in the annular chamber 127 between an inlet port 145 and an outlet port 146 so that the oil is circulated circumferentially through this chamber. The oil connections to the ports 145 and 146 are clearly shown in FIGS. 6 and 7. Heat produced by current passing through the silicon diode 62 is conducted by means of the annular heatsink 123 to the circulating oil to be removed thereby.

Associated with the diode-heatsink subassembly 121 and spaced therefrom is the fuse-indicating means subassembly 122 which completes the rectifying unit 32. The subassembly 122 generally comprises an annular conducting plate 147 (corresponding to the common conductor 74 shown in FIG. 3) adapted to be electrically and mechanically bolted at 150 to a terminal cap flange 148 mounted on the outer end of the inner coaxial conductor 58. When fastened to the transformer tank in this manner, the plate 147 is supported in spaced concentric relationship to the annular heatsink 123. As can be seen in FIGS. 6 and 7, there are a plurality of fuse-connecting lugs, shown as angular conducting members 152, mechanically affixed in symmetrical pattern to the conducting plate 147 by fastening means such as nut and bolt assemblies 154.

An annular insulating plate 156, spaced from conducting plate 147, is concentrically affixed thereto by a plurality of insulating blocks 158, conductive J-shaped members 160, and insulating angular members 162 arranged in concentric circles. As can be seen most clearly in FIG. 7, angular insulating member 162 in the inner circle is fastened to conducting plate 147, and conducting J-shaped member 160 is affixed to an axially extending leg 163 of angular insulating member 162. Annular insulating plate 156 is affixed to conductive J-shaped member 160 by means of bolt and nut assembly 164, but it is spaced from conducting J-shaped member 160 by insulating block 158. A short leg 166 of conducting J-shaped member 160 serves as a terminal tie point where the flexible cathode lead 131 from one of the diodes 62 in the inner circle of diodes is bolted to one terminal of a fuse 64. The short leg 166 also lies in a planar relation with an axially extending leg 167 of an associated angular conducting member 152 so that the cartridge fuse 64 can be connected therebetween.

A somewhat similar structure is associated with the outer circle of fuses 64 associated with the outer circle of diodes 62 on the heatsink 123. Each fuse 64 in the outer circle is bolted between an angular conducting member 152 and another angular conducting member 168 having a long leg 170. At the latter leg a cathode lead 131 of a diode 62 is bolted to the associated terminal of a fuse 64, as shown. Another insulating block 158 is disposed between annular insulating plate 156 and a short leg 172 of angular conducting member 168 to complete the fuse-indicating means subassembly 122. The fuses 64 in this subassembly serve as symmetrical conductive means for connecting the conducting plate 147 to the cathodes of the respective diodes 62. The plate 147 is connected by the terminal 148 to the inner coaxial conductor 58 which in turn is connected, inside the transformer tank, to one of the transformer secondary windings (see FIG. 2).

As is shown in FIGS. 6 and 7, a separate neon indicating lamp 68 is connected by means of wire 174 to long leg 170 for each fuse 64 in the outer circle; and another neon lamp 68 is connected by means of wire 174 to the conducting J-shaped member 160 associated with each fuse in the inner circle of fuses and rectifiers. Means, not shown, connect a second terminal of each neon lamp 68 together and to the conducting plate 147 to complete the lamp energizing circuit. Each of the neon lamps 68 is supported by an insulating ring 176 spaced from the conducting plate 147 by a plurality of insulating standoffs 178. The lamps 68 are symmetrically disposed in radial alignment with their associated fuse and diode so that any lamp that lights when a fuse blows as a result of diode failure will indicate which diode has failed.

FIG. 7 also shows details of the coaxial conductors 54 where they pass through the transformer tank wall 52 to its exterior. Inner conductor 58, which extends outside the tank further than the companion conductor 56 and is therefore embraced by the ring-like heatsink 123, is a tubular member having a radially extending flange 180 formed or welded thereon to axially locate it with respect to the companion coaxial conductor 56. Outer conductor 56, also tubular, is threadingly engaged by a locking nut 182 which positions a washer 184, cylindrical insulator pieces 186 and 188, and a mounting ring 190 against the back side of the terminal flange 142. The mounting ring 190 is sandwiched between the insulators 186 and 188 and is spaced from outer conductor 56 and it is bolted at 192 to the transformer tank wall 52 to mechanically support and locate the outer conductor 56 in an aperture 194 through which the coaxial conductors 54 extend. Another insulator sleeve 196 serves to join the flanges 180 and 142 and thereby to locate the inner conductor 58 in concentric relationship with the outer conductor 56. This arrangement thus forms a coaxial bushing on the transformer tank wall.

Oil within transformer tank 40 cannot escape through aperture 194 in the wall 52 because the mounting ring 190, in combination with insulators 186 and 196, flanges 142, 148 and 180, and the inner conductor 58 itself, effectively blocks fluid flow from inside the tank to the exterior thereof. Therefore, each rectifying unit 32 can be disconnected and removed from transformer tank 40 by separating flanges 116 and 118 and by removing the fastening means between the first unit terminal 138 and flange 142 (bolts 144) and between the conducting plate 147 and terminal flange 148 (bolts 150).

When a plurality of rectifying units 32, formed substantially as described with reference to FIGS. 6 and 7, are respectively mounted on a plurality of coaxial conductors 54 extending through walls of an oil-filled transformer tank 40, one conductor of each set of coaxial conductors is connected externally to the anodes of a plurality of paralleled diodes and internally to a negative D-C bus bar system (not shown in FIG. 7), while the companion conductor is connected between the cathodes of the same diodes and an end of one of the included transformer secondary windings. Inside the tank the negative bus bar system is coupled to the negative output terminals of the transformer-rectifier apparatus, and a positive D-C bus bar system is provided for connecting the neutral terminals of all secondary windings through an interphase to the positive output terminals of the apparatus. Thus all of the D-C buses and other current carrying members, with the exception of the external load circuit and the rectifying units 32 themselves, are safely located within the transformer tank where they are submerged in cooling oil. This is in contradistinction to the prior art systems where at least one of the D-C buses is generally mounted externally to the transformer tank. It offers the advantage of free access to the diodes and fuses, unencumbered by external bus work. In addition, it allows more efficient use of the D-C bus bars which can carry higher currents than would otherwise be permitted if they were not oil cooled. And the magnetic fields around the internal D-C buses do not interfere with proper current balance among paralleled diodes 62 on any of the external heatsinks 123.

Another advantage of our apparatus is that only one tank opening is required for each rectifying unit even though an integral transformer-rectifier unit is provided wherein substantially all the current carrying members are located within the transformer tank. The use of coaxial bushings not only saves space but also reduces reactance and eliminates the need for non-magnetic inserts in the tank wall where traversed by a unilateral D-C conductor. With the coaxial design utilized in our invention, no net current traverses the transformer wall 52 (or 50) and hence no magnetic flux issues from any set of conductors 54 to affect an imbalance in the amount of current conducted by the respective diodes of an adjacent rectifying unit 32. It will also improve current balance between two adjacent units if connected in parallel to the same transformer secondary winding.

It will be apparent that the task of assembling the rectifying units 32 to the transformer tank is a relatively simple one involving the steps of bolting terminal 138 to flange 142, plate 147 to flange 148, and the cathode leads 131 to the respective fuses 64. Therefore the rectifying units can conveniently be fabricated and preassembled (in two parts 121 and 122) separately from the transformer and then installed on the coaxial bushings of the completely preassembled, oil-filled transformer tank.

Briefly summarizing, an integral high-current transformer-rectifier apparatus can be constructed in accordance with this invention by using an annular rectifier mounting means and heatsink combination that is concentrically disposed on a coaxial bushing. Means are provided for symmetrically mounting one main electrode each of a plurality of solid-state rectifying devices in electrical, thermal and mechanical relationship with the heatsink. Another member, disposed in concentric, spaced relation to the heatsink, serves as a common terminal for the other main electrode of each device, and means are provided for electrically and mechanically connecting this member and the heatsink, respectively, to a pair of conductors comprising the coaxial bushing. One of these conductors is coupled inside the transformer tank to a secondary winding and thence to a D-C output terminal, while the companion conductor is connected via an internal bus to another D-C output terminal of opposite polarity. Preferably the heatsink is cooled by circulating transformer oil through a hollow chamber associated therewith, thereby aiding the dissipation of heat generated in the rectifying devices.

While a preferred form of the invention has been shown and described by way of illustration, many modifications may occur to those skilled in the art. It is contemplated therefore by the claims that conclude this specification to cover all such modifications as fall within the true spirit and scope of the invention.

What is claimed as new and desired to be secured by Letters Patent of the United States is:

1. Liquid cooled mounting means for a semiconductor device adapted to conduct direct current from a source to a load and adapted to be cooled by liquid from a circulation means comprising:
(a) an annular member of conducting material having an internal annular chamber including
   (i) semiconductor mounting means on said annular chamber for fastening one semiconductor electrode to said annular member electrically, mechanically and thermally,
   (ii) inlet and outlet ports formed in said annular member from said chamber and through said annular member, said ports formed for connection to the circulation means, and
   (iii) first terminal means on said annular member for connecting said annular member to the load mechanically and electrically, and
(b) a conducting plate including
   (i) conductive means on said conducting plate for connecting said plate to another semiconductor electrode, and
   (ii) second terminal means on said conducting plate for electrically connecting said plate to the source and for mechanically supporting said plate in a spaced relationship to said annular member.

2. A liquid cooled mounting means as recited in claim 1 adapted to be connected to coaxial conductors wherein said first terminal means comprises a plurality of terminal plates affixed to a surface of said annular member extending radially inward for connection with the outer conductor of the coaxial conductors, and wherein said second terminal means is adapted for connection to the inner coaxial conductor.

3. A liquid cooled mounting means as recited in claim 1 wherein said conductive means includes a fuse in series with the semiconductor device, said fuse being mounted on said plate, and wherein signal means is mounted on said plate and connected to said fuse to indicate when said fuse is blown.

4. An electric power rectifier adapted to conduct direct current from a source to a load and to act as a heatsink cooled by liquid from a circulation means comprising:
(a) a plurality of rectifying devices each having first and second main electrodes,
(b) an annular member of conducting material having an internal chamber including
   (i) mounting means for mechanically, electrically, and thermally fastening the first electrodes of said devices to said annular member in a symmetrical pattern thereon,
   (ii) inlet and outlet ports formed in said annular member for connecting said chamber to the circulation means, and
   (iii) first terminal means on said annular member for mechanically and electrically connecting said annular member to the load,
(c) a conducting plate with symmetrical conductive means for connecting said plate to the second electrode of the respective rectifying devices, and
(d) second terminal means on said conducting plate for electrically connecting said plate to the source and for mechanically supporting said plate in a spaced concentric relationship to said annular member.

5. In combination with a rectifier as recited in claim 4, an integral transformer unit including:
(a) a tank having input and output terminals mounted thereon and having a wall with an aperture formed therethrough, said input terminals being for connection to the source and said output terminals being for connection to the load,
(b) a transformer supported within said tank, said transformer having a primary winding and a secondary winding, said primary winding being connected to said input terminals,
(c) first means for connecting said secondary winding to one of said output terminals,
(d) inner and outer coaxial conductors extending from said aperture to the exterior of said tank where said annular member is concentrically disposed,
   (i) said outer conductor being connected to said first terminal means on said annular member and
   (ii) said inner conductor being connected, inside said tank, to said secondary winding and, outside said tank, to said second terminal means on said conducting plate,
(e) bushing means mounted on said tank wall for supporting said coaxial conductors in spaced relation with respect to each other and to the wall, and
(f) second means for connecting said outer conductor to another one of said output terminals.

6. An internal transformer-rectifier apparatus as recited in claim 5 wherein said transformer tank contains cooling liquid and circulation means is provided for circulating said liquid through said tank and through said chamber.

7. An integral transformer-rectifier system comprising:
(a) a tank having A-C input terminals and a pair of D-C output terminals mounted thereon and having a wall with at least one aperture formed therethrough,
(b) a transformer having at least one set of primary and secondary windings supported within said tank, said primary winding being connected to said A-C input terminals, said secondary winding having first and second terminals,
(c) first and second D-C busses supported within said tank and connected respectively to said A-C output terminals,
(d) means for electrically connecting said first bus to said first secondary winding terminal,
(e) at least one set of first and second coaxial conductors extending through said aperture to the exterior of said tank, one of said coaxial conductors being connected inside said tank to said second bus and the companion coaxial conductor being connected inside said tank to said second secondary winding terminal,
(f) bushing means mounted on said tank wall to support each set of said first and second coaxial conductors in insulating relation with respect to each other and to the wall,
(g) at least one annular member of conducting material mechanically and electrically connected to the outer end of said first conductor in concentric relationship therewith, said annular member having a plurality of rectifying devices mounted in a symmetrical pattern thereon, each device having one main electrode directly connected to said annular member, and
(h) means for connecting a second main electrode of each of said devices to the outer end of said second conductor.

8. The transformer-rectifier system of claim 7 in which said second coaxial conductor is inside said first conductor and extends outside said tank further than said first conductor.

9. The transformer-rectifier system of claim 7 wherein said tank contains a cooling liquid and means is provided for cooling said annular member with said liquid.

10. An integral transformer-rectifier system comprising:
(a) a tank having A-C input terminals and first and second output terminals mounted thereon and having a wall with at least two adjacent apertures formed therethrough,
(b) a transformer having primary and secondary windings supported within said tank with connections from the transformer primary to said A-C input terminals,
(c) first and second means for connecting the transformer secondary to said first and second output terminals, respectively, said first means including a D-C bus supported within said tank,
(d) said second means including
(i) at least two sets of first and second coaxial conductors extending from said apertures, respectively, to the exterior of said tank, each of said sets having one of its conductors connected inside said tank to the transformer secondary,
(ii) means for connecting the other conductors of both of said sets to said second output terminal,
(iii) at least two annular members of conducting material respectively connected to the exterior ends of the first conductors of said sets in concentric relationship therewith,
(iv) a plurality of rectifying devices mounted in a symmetrical pattern on each of said annular members, each device having one main electrode directly connected to the annular member on which it is mounted, and
(v) means for connecting a second main electrode of each of said devices to the exterior end of the second conductor of the associated set, and
(e) at least two mounting means for mounting the coaxial conductors of said sets, respectively, on said tank wall in spaced relation to each other.

References Cited
UNITED STATES PATENTS

| | | | |
|---|---|---|---|
| 2,999,971 | 9/1961 | Schnecke | 321—27 |
| 3,068,391 | 12/1962 | Kliesch | 321—8 |
| 3,184,646 | 5/1965 | Diebold | 317—101 |
| 3,193,754 | 7/1965 | Dortort | 321—27 |
| 3,210,636 | 10/1965 | Kaiser et al. | 321—8 |
| 3,223,901 | 12/1965 | Riley | 317—234 |
| 3,249,817 | 5/1966 | Sinclair et al. | 317—100 |

JOHN F. COUCH, *Primary Examiner.*

G. GOLDBERG, *Assistant Examiner.*